United States Patent
Samaniego et al.

(10) Patent No.: US 9,069,723 B2
(45) Date of Patent: Jun. 30, 2015

(54) COMPUTER-IMPLEMENTED METHODS AND SYSTEMS FOR DYNAMICALLY COMPILING AND SERVING ELECTRONIC CONTENT

(75) Inventors: Christopher Samaniego, San Rafael, CA (US); Venky Kumar, Fremont, CA (US); Brian McPheeters, Lake Forest, CA (US)

(73) Assignee: Adobe Systems Incorporated, San Jose, CA (US)

(*) Notice: Subject to any disclaimer, the term of this patent is extended or adjusted under 35 U.S.C. 154(b) by 238 days.

(21) Appl. No.: 13/112,506

(22) Filed: May 20, 2011

(65) Prior Publication Data

US 2014/0304379 A1 Oct. 9, 2014

(51) Int. Cl.
*G06F 15/177* (2006.01)

(52) U.S. Cl.
CPC .................... *G06F 15/177* (2013.01)

(58) Field of Classification Search
CPC .............................. H04W 4/18; G06F 15/177
USPC ........................................ 709/203, 221, 231
See application file for complete search history.

(56) References Cited

U.S. PATENT DOCUMENTS

| | | | | |
|---|---|---|---|---|
| 7,752,202 B2 * | 7/2010 | Kobori et al. | ................. | 707/736 |
| 2003/0225859 A1 * | 12/2003 | Radia et al. | ................... | 709/219 |
| 2006/0089969 A1 * | 4/2006 | Brown et al. | ................. | 709/203 |
| 2010/0094931 A1 * | 4/2010 | Hosur et al. | ................. | 709/203 |
| 2011/0283309 A1 * | 11/2011 | Bliss et al. | ...................... | 725/25 |

OTHER PUBLICATIONS

Macromedia Flash Support Center Basics; Generator for Flash users, available on Feb. 17, 2011 at http://adobe.com/support/flash/finalproduction/gen4flsh/.

* cited by examiner

*Primary Examiner* — Un C Cho
*Assistant Examiner* — Natali N Pascual Peguero
(74) *Attorney, Agent, or Firm* — Kilpatrick Townsend & Stockton LLP (57) ABSTRACT

One exemplary embodiment involves receiving a request at a server device, the request identifying electronic content and a modification for the electronic content. The request may be based at least in part on information provided in a uniform resource locator (URL) or other address used by a requesting client device to initiate the request for the electronic content from the server. A parameter of the URL or other address may be used to specify the modification. The exemplary embodiment further involves identifying, via the server device, a source file associated with the electronic content, changing, via the server device, an element within the source file according to the modification identified in the request, and providing modified electronic content from the server device for use on the requesting client device.

19 Claims, 5 Drawing Sheets

RECEIVE A REQUEST AT A SERVER DEVICE, THE REQUEST IDENTIFYING ELECTRONIC CONTENT AND A CHANGE FOR THE ELECTRONIC CONTENT
310

IDENTIFY, VIA THE SERVER DEVICE, A SOURCE FILE ASSOCIATED WITH THE ELECTRONIC CONTENT
320

CHANGE, VIA THE SERVER DEVICE, AN ELEMENT WITHIN THE SOURCE FILE ACCORDING TO THE CHANGE IDENTIFIED IN THE REQUEST
330

PROVIDE CHANGED ELECTRONIC CONTENT FROM THE SERVER DEVICE FOR USE ON THE REQUESTING CLIENT DEVICE
340

COMPUTER-IMPLEMENTED METHODS AND SYSTEMS FOR DYNAMICALLY COMPILING AND SERVING ELECTRONIC CONTENT

FIELD

This disclosure relates generally to computer software and more particularly relates to the creation, modification, use, and distribution of electronic content.

BACKGROUND

Servers are used to make various types of electronic content available to requesting client devices. In response to a request from such a client device, for example, one or more files that have been stored at a server may be sent to the client device to provide a visual and/or audio presentation of the requested electronic content at the client device. Files provided by a server may have various formats/types including, but not limited to, text files, graphic files, declarative files such as Hyper Text Markup Language (HTML) and eXtensible Markup Language (XML) files, and script-based files that are executed at the client device. Files provided by a server may provide Adobe® Flash®-based content or other types of rich Internet application (RIA) content that provides enhanced functionality and features that are more robust than typical web page features.

The content provided by servers can be considered "static" in the sense that the same content is generally provided regardless of the context of the request, the time of the request, and/or the individual requesting the content. Making a piece of content "dynamic," i.e., providing it differently in different contexts, at different times, and/or to different users, has been difficult. Generally, making server-provided content available in different contexts, at different times, and/or to different users has generally required either making multiple copies of the content on the server for different contexts, times, and/or users or has required creating and using relatively complicated scripts within the content files themselves to provide the content differently. Accordingly, the updating, localizing, and other dynamic provision of server-provided content has been burdensome, difficult, and has otherwise been frustrated.

As a specific example, a content creator may use a content creation application, such as Flash® Professional, Flash® Builder®, or Flash® Catalyst®, to create content that is stored as one or more source files, e.g., as a FLA formatted file, by the content creation application. The source may then be compiled to provide a file, e.g., in the SWF file format, that can be distributed by a server for rendering by a player application, such as an Adobe® Flash® Player, on a client device. To make the graphics, text, video, sound, or other elements dynamic, a content creator may use the content creation application to create custom script, such as custom Actionscript® code, to access external information and/or alter the contents. Such production of dynamic content has thus generally required knowledge of script-programming language techniques and involved complicated development processes. Existing techniques for providing dynamic content from servers suffer from these and various other deficiencies.

SUMMARY

One exemplary embodiment involves receiving a request at a server device, the request identifying electronic content and a modification for the electronic content. The request may be based at least in part on information provided in a uniform resource locator (URL) or other address used by a requesting client device to initiate the request for the electronic content from the server. A parameter of the address may be used to specify the modification to be made in the electronic content. The exemplary embodiment further involves identifying, via the server device, a source file associated with the electronic content, changing, via the server device, an element within the source file according to the modification identified in the request, and providing modified electronic content from the server device for use on the requesting client device.

Another exemplary embodiment involves sending a request to a server device for electronic content and, upon receiving the electronic content from the server, providing a preview of the electronic content for display as part of a user interface. This exemplary embodiment further involves receiving input at the user interface specifying a modification to the electronic content and creating a uniform resource locator (URL) or other address based at least in part on the input specifying the modification. Requesting client devices can use the address to request the electronic content with the modification from the server device. A parameter of the address may be used to specify the modification.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Computer-implemented systems and methods for providing updated, localized, and other dynamically-modified electronic content from a server are disclosed. Server-provided content is made accessible using and addresses such as uniform resource locator (URL) strings that include parameters that are used to manipulate the content to be provided by the server. For example, a server may receive a URL request that identifies an item of electronic content and identifies a modification to that item. The server may make the modification to a source file associated with the item of electronic content, compile the modified item into a renderable item and send that item to the content requester. As a particular example, the server may receive a URL that identifies an item of executable or otherwise end-user-usable content, such as Flash® content. The URL may include a URL parameter specifying that a text item within the content should be modified from "10% off" to "20% off." To make the modification, the server may modify a source of the content, such as an eXtensible Markup Language (XML) file or FLA file used to create or otherwise associated with a webpage or Flash® content that will be provided. The server may compile or otherwise convert the modified source content into usable content, for example by compiling an FLA file into a SWF file. The server may provide the usable content, such as the SWF file, to the content requester. The content requester observes the modified content, i.e., sees the "20% off" text rather than the "10% off" text.

These examples are provided to illustrate that the manipulation of Flash® and other electronic content provided from a server can be controlled by parameters in address commands, such as URL commands, that are used to access that content. Using these exemplary techniques and other similar techniques disclosed herein content may be provided without requiring the making of multiple copies of the content on a server for different contexts, times, and/or users. Similarly, content may be provided without requiring the creating and using of complicated scripts within the content to control the dynamic provision of the content.

A content creator may create source content, such as a FLA file or other source file, using a content creation application and then upload the source content to a server, such as a computer device running Adobe® Scene7® as a back office server. One exemplary embodiment provides a user interface that allows users to define manipulation of various attributes defined by source content. These attributes include but are not limited to replacing symbols, changing text, changing text attributes, replacing bitmaps, and changing the visibility of layers. Such a user interface may result in a URL or other address that identifies the user-specified modifications as URL or other address parameters. As the user makes changes using the user interface, a URL or other address is created that points to the source content on the server, e.g., to the an XML, FLA, or other source file defining the source content, and specifies information, commands, or other parameters used by the providing server to manipulate the source content. When the server receives the URL or other address, it accesses the source content, applies the transformations or other specified modifications to the source content, and serves the modified content. The server may compile, generate, or otherwise process modified source content to provide deliverable content items. As a specific example, a modified FLA file may be compiled to produce a SWF file that is provided in response to a received URL address that specified the modifications. The deliverable item, such as a SWF file compiled based on a URL specifying such a modification, may be cached to improve server performance.

Embodiments described herein facilitate the dynamic compilation of source content such as XML files, FLA files, and other source files on a server. Dynamic content can be provided without requiring any special script development to provide for the modified attributes of the content. Content modifications can also be specified after the source content is uploaded to a server. Moreover, dynamic content can be provided without requiring that the source content include variables as placeholders for dynamically editable items. Dynamic content can be provided from source content that does not include any script or programmatic code and thus can be provided from entirely declaratively-formatted source content, such as from XML-formatted source files.

Embodiments can further provide a user interface for specifying the attribute changes where the user interface is able to detect which attributes of the content can be manipulated. The user interface may provide tools and features that allow a non-programmer to specify changes, for example, using graphical representations, menus, wizards, data entry forms, and other user-friendly input features that facilitate specifying such changes without knowledge of scripting or programming techniques. The user interface can use the received input to create URLs and other types of addresses that include the specified changes as parameters. Such a user interface can allow changes to electronic content to be made in shorter amounts of time and by less technically-sophisticated users. For example, marketing professionals who may be unfamiliar with computer programming techniques may use such a user interface to change content to target and personalize an advertising campaign without the need for technically-sophisticated software coding and development. Similarly, the use of URL-specified content changing parameters and other address-specified content changing parameters and/or user interface features for creating addresses containing such parameters can be used in the localization of content without requiring technically-sophisticated software coding and development.

These illustrative examples are given to introduce the reader to the general subject matter discussed here and are not intended to limit the scope of the disclosed concepts. The following sections describe various additional embodiments and examples with reference to the drawings in which like numerals indicate like elements.

Figure 1:
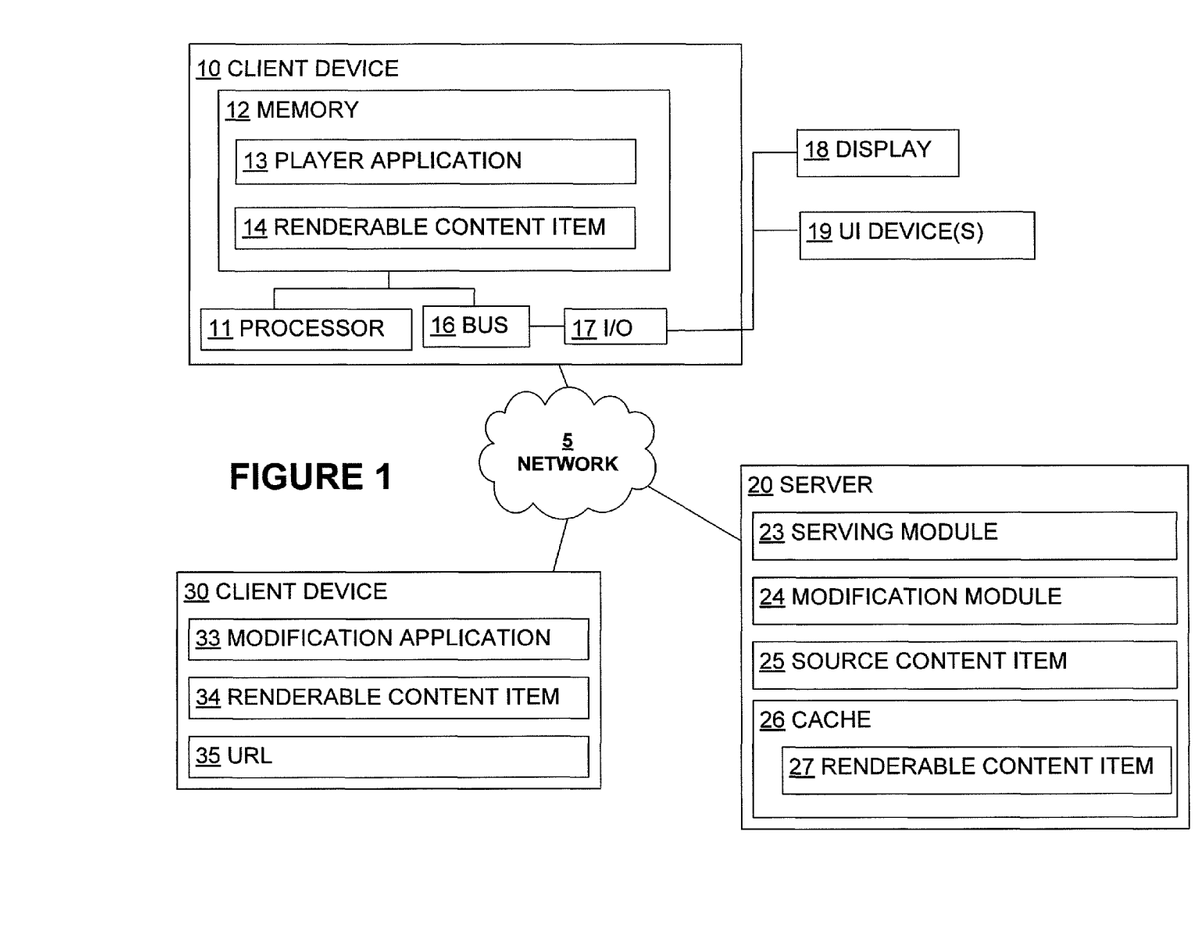
FIG. 1 is a block diagram depicting exemplary computing devices in an exemplary computing environment for implementing certain embodiments.

Referring now to the drawings, FIG. 1 is a block diagram depicting exemplary computing devices in an exemplary computing environment for implementing certain embodiments. Applications and other electronic content execute or are otherwise used on the exemplary computer device 10 and are shown as functional components or modules. As is known to one of skill in the art, such applications and content may be resident in any suitable computer-readable medium and execute on any suitable processor. For example, as shown the client device 10 comprises a computer-readable medium such as a random access memory (RAM) 12 coupled to a processor 11 that executes computer-executable program instructions and/or accesses information stored in memory 12. Such a processor 11 may comprise a microprocessor, an ASIC, a state machine, or other processor, and can be any of a number of computer processors. Such a processor can comprise, or may be in communication with a computer-readable medium which stores instructions that, when executed by the processor, cause the processor to perform the steps described herein.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The client device 10 may also comprise a number of external or internal devices such as a mouse, a CD-ROM, DVD, a keyboard, a display, audio speakers, one or more microphones, or any other input or output devices. For example, device 10 is shown with a display 18 and various user interface devices 19. A bus, such as bus 16, is included in the device 10. Device 10 could be a personal computing device, a mobile device, or any other type of electronic devices appropriate for providing one or more of the features described herein.

FIG. 1 illustrates an exemplary device 10 that comprises, in memory 12, a player application 13 and renderable electronic content 14 for use on the player application 13. The client device 10 of FIG. 1 may request electronic content from server 20 and receive, directly or indirectly, renderable content item 14, which is then used by the client device 10 to provide the electronic content on the client device, for example, within player application 13 and displayed on display 18.

As used herein, the terms "player" and "player application" refer to any electronic module or program that is used to play or otherwise present electronic content on an electronic device. Electronic content may be played or used through various types of player applications including, but not limited to, word processing applications, audio playing applications, video playing applications, rich Internet application players, Internet browser applications, and Internet browser plug-ins. Exemplary electronic content may comprise text, graphics, audio, video, and any other content. Electronic content may be presented or otherwise used on an electronic device in a variety of ways. Electronic content may, as examples, be provided as a stand alone application that can be executed directly within a computer operating system or may be content that is provided indirectly through use of a player application.

As used herein, the terms "renderable content," "renderable content item," and "presentation file" refer to any data, file, or other item that can be displayed, executed, or otherwise used by a player application without conversion to provide electronic content specified therein. Examples of renderable content include, but are not limited to, executable applications, web pages, and rich Internet applications. Renderable electronic content can be provided as executable files, web page files such as HTML files, and as rich Internet application files such as SWF files.

As used herein, the terms "source," "source content," and "source content item" are used to describe any data, file, or other source of electronic content that can be converted to provide another form to provide the electronic content. For example, a source may be a file comprising declarative and/or imperative programming code that can be compiled or otherwise converted to provide a renderable content item, e.g., a file that can be used by a player application to display or otherwise present the electronic content defined by the programming code.

As used herein the terms "changing" and "modifying" are used synonymously with one another herein. Similarly, the terms "change" and "modification" are used synonymously with one another herein.

The server device or server 20 of FIG. 1 comprises a serving module 23, a modification module 24, a source content item 25, and a cache 26. The serving module 23 responds to request for electronic content from client devices such as client devices 10 and 30. The serving module 23 may interpret a request to identify a source content item stored on the server 20, such as source content item 25, and use that source content item to respond to the request. In one example, the serving module 23 sends the source content item to a requesting client device. In another example, the serving module 23 converts the source content item into a renderable content item, such as renderable content item 27, and then sends it to the requesting client device. After such a conversion, the renderable content item 27 may be stored in the cache 26 of the server 20 so that the server 20 can provide it in response to future requests for the electronic content.

The modification module 24 of the server 20 of FIG. 1 can be used in conjunction with the serving module 23 to provide modified electronic content in response to requests for modified electronic content. For example, a request may identify electronic content and a modification for that electronic content. Such a request may include or be based in part upon information provided in an address, such as in a uniform resource locator (URL), used by a requesting client device, such as one or more client devices 10 and 30, to initiate the request for the electronic content from the server 20. A parameter of the address may specify the modification to the electronic content. In response to such a request, the modification module 24 may identify a source file associated with the electronic content and modify an element within the source file according to the modification identified in the request. The serving module 23 then provides modified electronic content from the server 20 for use on the requesting client device. In one example, the serving module 23 sends the modified source content item to a requesting client device. In another example, the serving module 23 and/or modification module 24 converts the source content item into a renderable content item, such as renderable content item 27, and then sends it to the requesting client device. After such a conversion, the renderable content item 27 may be stored in the cache 26 of the server 20 so that the server 20 can provide it in response to future requests for the modified electronic content.

The client device 30 of FIG. 1 comprises a modification application 33, a renderable content item 34, and a URL 35. In one exemplary embodiment, the modification application comprises one or more modules configured to send a request to server 20 for electronic content, and upon receiving the electronic content as renderable content item 34 from the server 20, provide a preview of the electronic content for display as part of a user interface. The modification application 33 is further configured to receive input at the user interface specifying a modification to the electronic content and create URL 35 based at least in part on the input specifying the modification. The created URL can then be used by requesting client devices, such as client device 10 and 20, to request the electronic content with the modification from the server 20. In one embodiment, a parameter of the URL specifies the modification.

Figure 2:
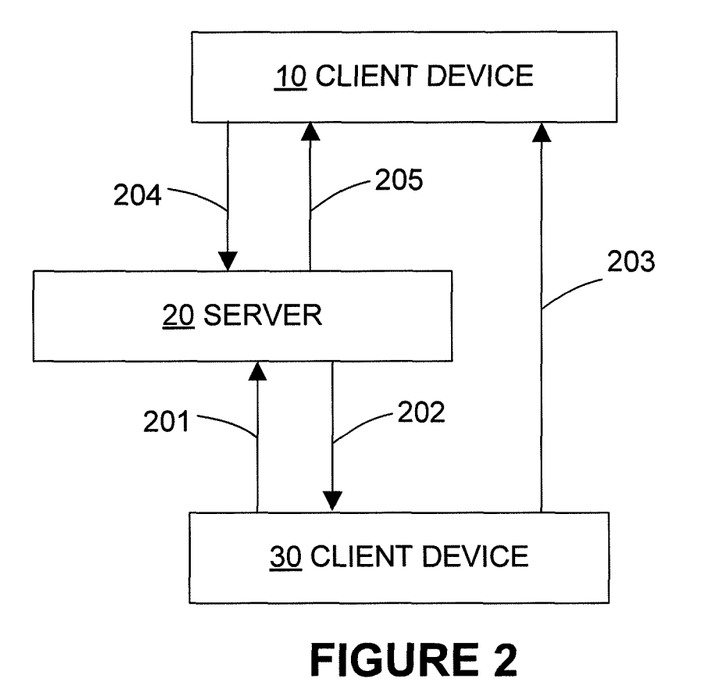
FIG. 2 illustrates exemplary accessing of modified electronic content from a server storing electronic content.

FIG. 2 illustrates exemplary accessing of modified electronic content from a server 20 storing electronic content. In this example, client device 30 is used to create a URL or other type of address for accessing modified electronic content stored on server 20. Client device 30 sends a request 201 for electronic content to server 20 and receives the electronic content 202 from the server. Client device 30 may receive the electronic content as a piece of renderable content, for example, as a renderable SWF created from a source FLA file specified in request 201. Client device 30 then identifies a modification for the electronic content. For example, user input may specify that a text element appearing within the electronic content will have a new value, e.g., changing the text element value from "WINTER SALE" to "SPRING SALE." The client device 30 uses the identified modification to create a URL or other address that identifies the modification and makes the URL or other address available to other devices for accessing the modified electronic content from server 20. In this example, the URL 203 is made available directly or indirectly from client device 30 to client device 10. In one example, client device 30 is used by a designer or marketer to create a URL specifying various modifications and then publish the URL 203 on a website for consumption by other users, for example, using client device 10. Client device 10 may send a request 204 based at least in part on the URL 203 to server 20 and, in response, receive the modified electronic content 205 from the server 205. The modified electronic content 205 is then presented on the client device 10.

Figure 3:
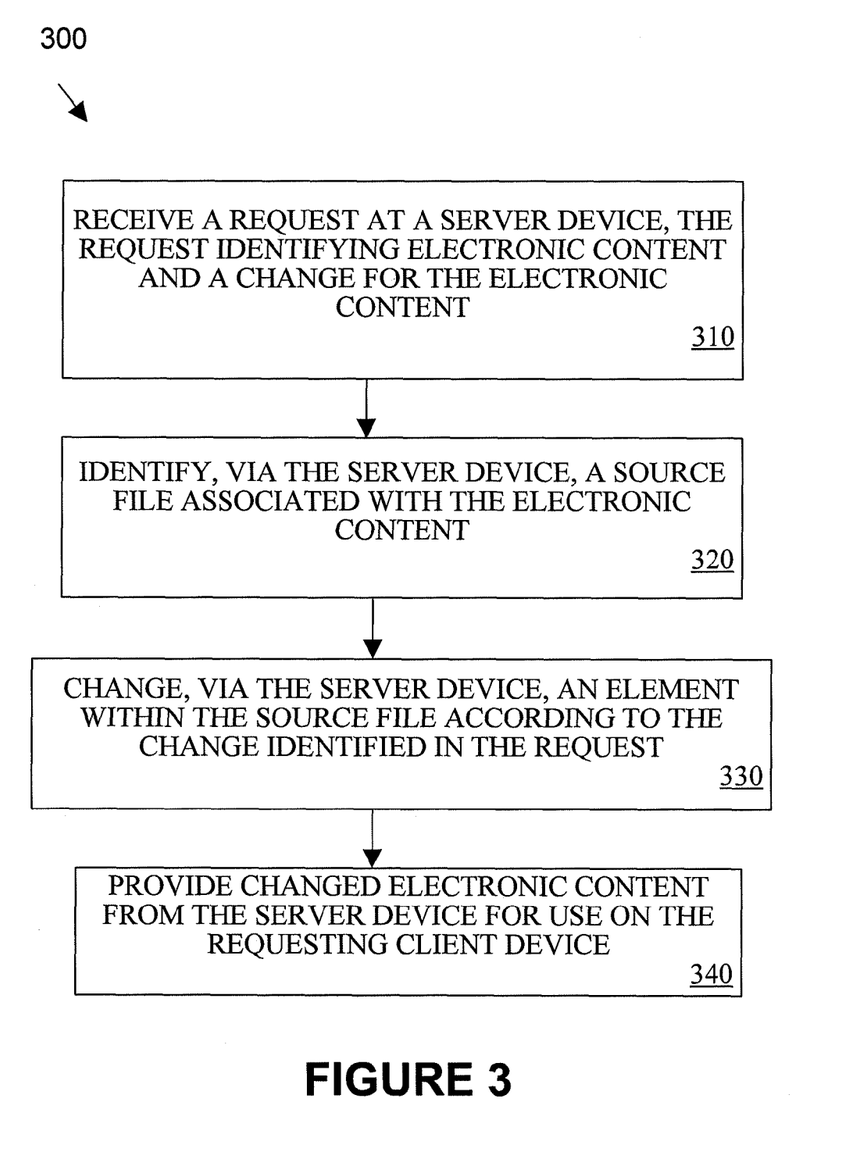
FIG. 3 is a flow chart illustrating an exemplary method of providing modified electronic content from a server.

FIG. 3 is a flow chart illustrating an exemplary method 300 of providing modified electronic content from a server. Such an exemplary method 300 may be performed on a variety of computer devices including, but not limited to server 20 of FIG. 1. For purposes of illustration not limitation, the features of exemplary method 300 are described with reference to elements of FIG. 1.

The exemplary method 300 involves receiving a request at a server device, the request identifying electronic content and a change for the electronic content, as shown in block 310. In one embodiment, the request is based at least in part on information provided in a URL used by a requesting client device to initiate the request for the electronic content from the server. A parameter of the URL may specify the modification. The URL may identify an element of the source file and a changed value for the identified element of the source file, for example. The URL may also identify or otherwise provide access to the electronic content and/or a storage location at which the electronic content is available. The URL may additionally or alternatively identify a file type in which the electronic content is requested, e.g., identifying a file type compatible with a particular player application on a player application identified on a client device.

The exemplary method 300 involves identifying, via the server device, a source file associated with the electronic content, as shown in block 320. For example, server 20 of FIG. 1 may receive a URL that identifies a particular source file stored on server 20. The exemplary method 300 involves changing, via the server device, an element within the source file according to the change identified in the request, as shown in block 330. For example, server 20 of FIG. 1 may receive a request for content that specifies that an image of a sedan automobile is to be used in the electronic content in place of an image of a convertible automobile. The server 20 may change a reference in a source file associated with the electronic content to identify a file containing the image of the sedan automobile rather than the file containing an image of the convertible automobile.

The exemplary method 300 involves providing modified electronic content from the server device for use on the requesting client device, as shown in block 340. For example, server 20 of FIG. 1 may provide the electronic content with the image of a sedan automobile in place of the image of a convertible automobile when such a change is specified by the request. The electronic content may be provided in any suitable manner. In one embodiment, a source file specifying the electronic content is sent to the requesting client device. In another embodiment, the source file is converted into a presentation file that is sent to the electronic device.

Providing the modified electronic content from the server device for use on the requesting client device may involve converting source content into one or more presentation files. In one embodiment, the request for electronic content comprises or is based upon a URL that identifies an identified file type. In this example, providing the modified electronic content can involve converting, via the server device, the source file into a presentation file having the identified file type and sending the presentation file from the server device for use on the requesting client device. As specific examples, if the identified file type specifies a FLA format, the presentation file is a FLA file and, if the identified file type specifies a HTML5 format, the presentation file is a HTML5 file. One exemplary server conversion involves converting a source file that is a FLA file to a presentation file that is a SWF file. Another exemplary server conversion involves converting a source file to a HTML5 file. Another exemplary server conversion involves converting a source file to a raster format. As used herein references to files having a particular format/type are intended to encompass files having any prior, existing, and future formats/types associated with the applicable label. For example, reference to an "HTML5 file" refers to any file having a file format/type that is consistent with any prior, existing, and future HTML5 format/type. In one embodiment, identified file type in the URL is automatically determined at a requesting client device based on a detection of player capabilities available on the client device. For example, the electronic content may be provided as a HTML5 file if it is determined that the client device lacks an application capable of playing SWF files.

In one exemplary embodiment, providing the modified electronic content comprises converting, via the server device, the source file into a presentation file renderable by a player application on the client device and sending the presentation file from the server device for use on the requesting client device. In one exemplary embodiment, a source file is an eXtensible Markup Language (XML) file that includes tags that allow the server to easily identify and/or change a particular attribute of the electronic content. For example, the XML file may include tags that identify a title and the server can change the title by changing text within the title tags of the XML file.

One exemplary embodiment involves caching, via the server device, the presentation file. The cached presentation file is then available to be provided by the server device in response to additional requests identifying the electronic content and the change for the electronic content.

Figure 4:
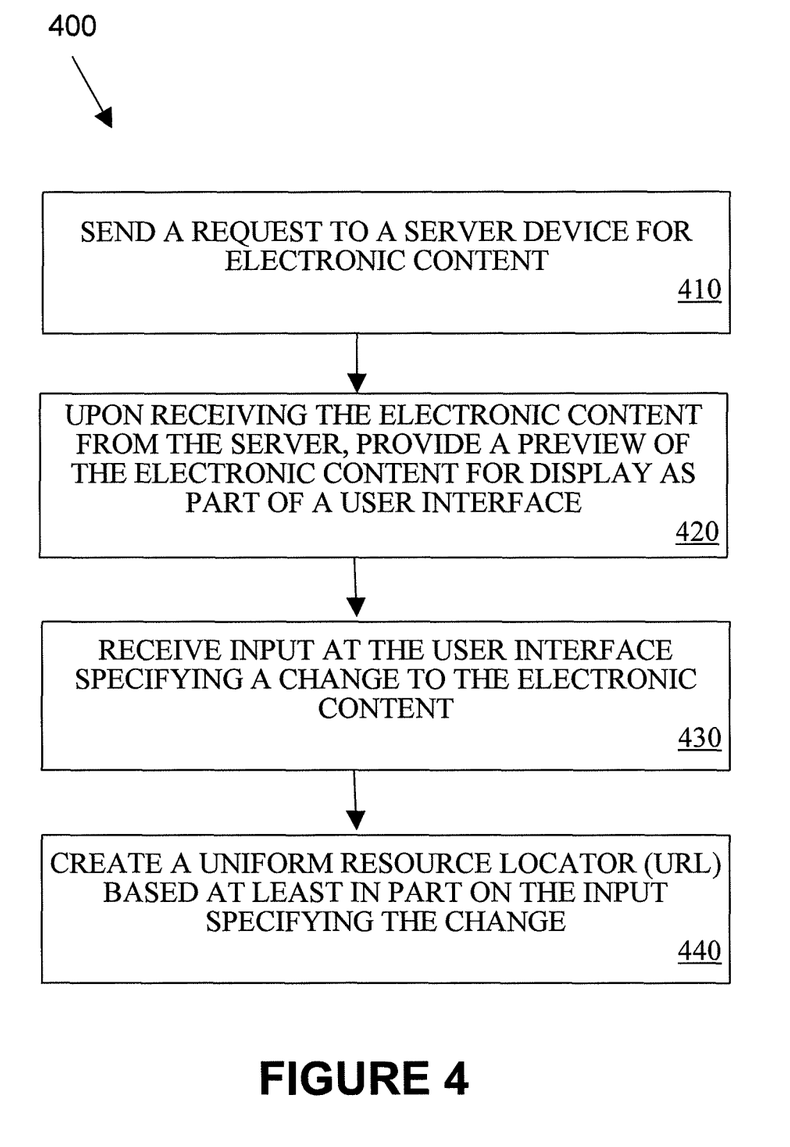
FIG. 4 is a flow chart illustrating an exemplary method of creating a URL to make server stored electronic content available with one or more modifications specified by the URL.

FIG. 4 is a flow chart illustrating an exemplary method of creating a URL to make server stored electronic content available with one or more changes specified by the URL. Such an exemplary method 300 may be performed on a variety of computer devices including, but not limited to client device 30 of FIG. 1. For purposes of illustration not limitation, the features of exemplary method 400 are described with reference to elements of FIG. 1.

The exemplary method 400 involves sending a request to a server device for electronic content, as shown in block 410, and, upon receiving the electronic content from the server, providing a preview of the electronic content for display as part of a user interface, as shown in block 420. The request itself may be or may be derived from a URL identifying the electronic location or a location from which the electronic content is accessible.

The exemplary method 400 further involves receiving input at the user interface specifying a change to the electronic content, as shown in block 430. For example, the user interface may provide one or more input fields that allow a user to identify text within the electronic content to be replaced as well as one or more input fields that allow the user to identify text that will be used instead of the replaced text. The change may involve changing an attribute of text, a symbol, an image, or a video of the electronic content and/or identifying a substitute item of text, a symbol, an image, or a video to replace an item of the electronic content, as examples. Specific examples involve changing text to change "BIG" to "HUGE," changing the color, size, or other appearance attribute of such text, substituting a video of a laptop computer with a video of a desktop computer, changing attributes of a bitmap image, pulling a bitmap from an external server, etc. Changes can be employed for a variety of reasons. Exemplary uses involve substituting banner advertisements used in electronic content and localizing rich Internet applications by providing changes for particular geographic locations, market segments, languages, and users, etc.

In one embodiment, the exemplary method 400 can involve receiving input identifying an element of the electronic content to change and/or input identifying a modified value for the element. In one embodiment, the exemplary method 400 can further involve providing a preview tool that receives input specifying one or more attribute changes and, in response to the input specifying the one or more changes, displaying a modified version of the electronic content, the modified version including the one or more changes. The preview tool may create a preview URL specifying the one or more changes and request the modified version of the electronic content from the server using the preview URL.

Figure 5:
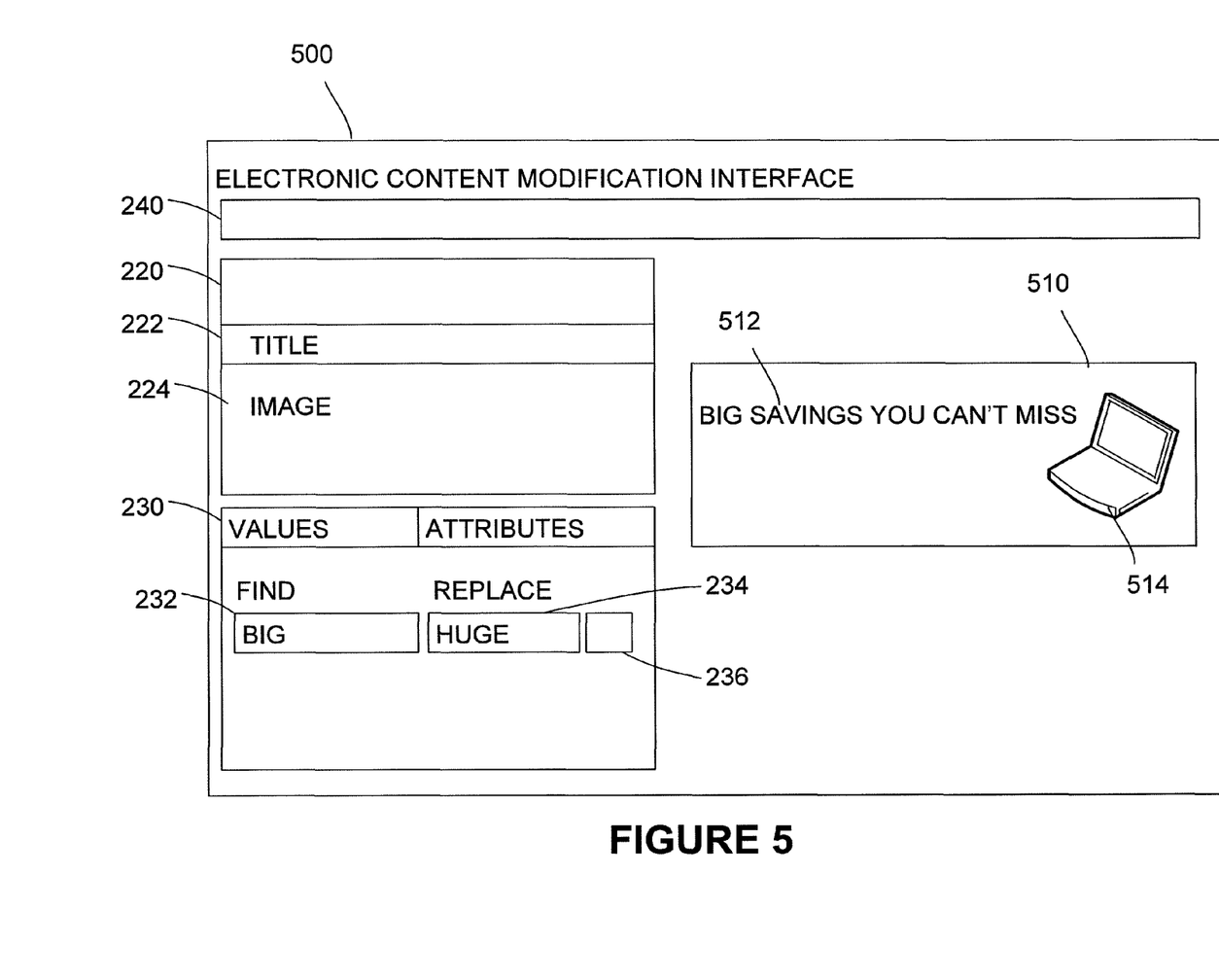
FIG. 5 is a screenshot illustrating an exemplary user interface for specifying a modification to server-provided electronic content.

FIG. 5 is a screenshot illustrating an exemplary user interface 500 for specifying a change to server provided electronic content. In this example, the user interface 500 includes a preview 510 of the electronic content that is shown displaying a title element 512 "BIG SAVINGS YOU CAN'T MISS," and an image 514 of a laptop computer device. The user interface 500 determines that these elements can be modified and includes element references 222, 224 in an element reference area 220 referencing the title element 512 and image 514, respectively, to allow the user to select which of the elements is to be modified.

The user interface 500 includes an edit area 230 in which a user can specify a change to an element currently selected in the element reference area 220. In this example, reference 222 to the text element 512 is selected. The edit area 220 in this example includes a find 232 and replace 234 feature that allows a user to find text (e.g., to find "BIG" within the text of the title element 512) and to specify the text that replaces the find text (e.g., specifying the "HUGE" text to replace the "BIG" text). After entering this information, the user can submit a change with change button 236. Alternative methods of receiving input specifying changes are of course possible. For example, in another embodiment, the edit area 230 displays the entire text of the title element 512 "BIG SAVINGS YOU CAN'T MISS," allowing the user to simply edit any portion of that text. As another example, the preview area itself may display a what-you-see-is-what you get interface in which elements of the electronic content that can be modified are directly editable. For example, a user might resize the image 514 within the preview 510. User interface 510 may also be used to edit attributes of text, image, video, and other elements for example using an attributes tab of edit area 230. The user interface includes a URL display area 240 that displays the URL associated with the electronic content. The URL displayed in URL display area 240 is updated in response to editing specified using the user interface 500. For example, an edit specifying that the "HUGE" text is to replace the "BIG" text may change an exemplary URL from http://s7d7.scene7.com/xfl/flash/W2PTest/bannerADb2 to http://s7d7.scene7.com/xfl/flash/W2PTest/bannerADb2?&rti.Header(Big=Huge;). A variety of other user interface features may alternatively or additionally be used to provide different editing features. The user interface may include a module or application that interacts with a content providing server to create a URL that specifies the changes to content provided by that server.

Returning to the discussion of FIG. 4, the exemplary method 400 further involves creating a uniform resource locator (URL) based at least in part on the input specifying the change, as shown in block 440. In one embodiment, requesting client devices can use the URL to request the electronic content with the change from the server device and a parameter of the URL specifies the change.

The following example further illustrates certain inventive aspects provided in this disclosure. In this example, a Flash® development professional creates a Flash® document, i.e., a FLA file, that includes animation, video, bitmaps etc. Text instances, bitmap instances, symbol instances and URLs inside ActionScript code may be configured to follow rules specified by an Adobe® Scene7® or another other document hosting service and may be made available for manipulation by the user. The FLA file is uploaded to the Adobe® Scene7® or other document hosting service's servers using, for example, Scene7® Publishing System (SPS) or Scene7® CSXS extension in Adobe® Flash® Professional. The FLA is copied to a file share and is available at the Scene7® Flash® Server (FS).

The developer opens a preview tool that contacts the server to open the FLA file and return an XML description of the FLA contents. The XML contains a list of text instances, bitmap instances and symbol instances with their attribute values extracted from the original FLA source file. The preview tool creates a user interface with these values from the XML response and these values are available for user manipulation. The user works with the preview tool and can choose to manipulate different objects. As the user manipulates objects a URL command is created. The URL command contains the object the user wishes to manipulate and the values the user has selected in the preview tool.

The URL is sent to the server and the server determines if the URL has been previously requested and the results have been cached. If previously requested and the results are still in cache, then a cached SWF is returned. This helps optimize server performance for requests that are constantly being made. If the request is not cached, the preview FS server will open the FLA referred to in the URL and apply the commands found in the URL. These commands include, but are not limited to, text string search and replace, replace bitmaps, replace symbol instances, or adjust attributes for objects. The server generates a new SWF and the resulting SWF is placed into the server cache for future requests and served back for preview. Once the user is done working with the preview tool, the user can publish the results for live traffic. The user can start the publish process using the user interface. Once the FLA is published, the developer can request the SWF via the URL and the URL is sent to a server where it may be distributed or made accessible to client devices that will request the electronic content.

One exemplary embodiment involves determining if the device is Flash capable, HTML5 capable, or has additional and/or other capabilities and then delivers either a SWF file, HTML5 content, or another type of content based on the determination of capabilities. Accordingly, a system may be configured to adapt content via URL specification to the capabilities of the recipient device (e.g., as HTML5, SWF, raster content, etc.) in addition to or as an alternative to using the URL to specify changes to the content.

A preview only server rather than a live server can be used during the creation of a URL that specifies electronic content changes. Once the content is published to a live server, the URL can be updated to identify the location of the content on the live server rather than the preview server.

GENERAL

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A computer-implemented method comprising:
  receiving, at a server, a Uniform Resource Locator (URL) from a requesting client, wherein the URL comprises one or more URL parameters which:
    a) identify electronic content from the server
    b) identify a modification of the electronic content, and
    c) specify selection criteria identifying characteristics of one or more data elements of the electronic content to which the modification is to be applied;
  based on the URL, identifying, via the server, a source file associated with the electronic content;
  based on the URL, selecting one or more data elements of the source file;
  based on the URL, modifying, via the server, the selected data elements; and
  providing modified electronic content from the server for use on the requesting client.

2. The method of claim 1:
  wherein the URL identifies an identified file type; and
  wherein providing the modified electronic content comprises converting, via the server, the source file into a presentation file having the identified file type and sending the presentation file from the server for use on the requesting client.

3. The method of claim 2 wherein
  if the identified file type specifies a FLA format, the presentation file is a FLA file; and
  if the identified file type specifies an HTML format, the presentation file is an HTML file.

4. The method of claim 2 wherein the source file is a FLA file and the presentation file is a SWF file.

5. The method of claim 2 wherein the presentation file is an HTML5 file.

6. The method of claim 2 wherein the identified file type in the URL is automatically determined at the client based on a detection of player capabilities available on the client.

7. The method of claim 1 wherein providing the modified electronic content comprises converting, via the server, the source file into a presentation file renderable by a player application on the client and sending the presentation file from the server for use on the requesting client.

8. The method of claim 7 wherein the source file is an eXtensible Markup Language file.

9. The method of claim 7 further comprising caching, via the server, the presentation file, wherein the cached presentation file is available to be provided by the server in response to additional requests identifying the electronic content and the modification for the electronic content.

10. The method of claim 1 wherein providing the modified electronic content comprises compiling, via the server, the source file into a compiled file and sending the compiled file from the server for use on the requesting client.

11. The method of claim 1 wherein the URL identifies:
an element of the source file; and
a modified value for the identified element of the source file.

12. A system comprising:
a computer configured to execute instructions stored in a non-transitory computer-readable medium on one or more devices providing an application for specifying modifications to electronic content,
the application configured to cause the computer to perform the steps comprising:
  sending a request to a server for electronic content;
  upon receiving the electronic content from the server, providing a preview of the electronic content for display as part of a user interface;
    receiving input at the user interface specifying a modification to the electronic content; and
  creating a Uniform Resource Locator (URL) based at least in part on the input specifying the modification, wherein the URL comprises one or more URL parameters which:
    a) identify electronic content from the server,
    b) identify a modification of the electronic content, and
    c) specify selection criteria identifying characteristics of one or more data elements of the electronic content to which the modification is to be applied.

13. The system of claim 12 wherein the application further comprises one or more modules configured to receive input identifying an element of the electronic content to modify.

14. The system of claim 13 wherein the application further comprises one or more modules configured to receive input identifying a modified value for the element.

15. The system of claim 12 wherein the application further comprises one or more modules configured to provide a preview tool configured to receive input specifying one or more attribute modifications and, in response to the input specifying the one or more modifications, to display a modified version of the electronic content, the modified version including the one or more modifications.

16. The system of claim 15 wherein:
the preview tool creates a preview URL specifying the one or more modifications and requests the modified version of the electronic content from the server using the preview URL.

17. The system of claim 12 wherein the modification comprises changing an attribute of text, a symbol, an image, or a video of the electronic content.

18. The system of claim 12 wherein the modification comprises identifying a substitute item of text, a symbol, an image, or a video to replace an item of the electronic content.

19. A non-transitory computer-readable medium on which is encoded program code, the program code comprising:
  program code for receiving, at a server, a Uniform Resource Locator (URL) from a requesting client, wherein the URL comprises one or more URL parameters which:
    a) identify electronic content from the server,
    b) identify a modification of the electronic content, and
    c) specify selection criteria identifying characteristics of one or more data elements of the electronic content to which the modification is to be applied;
  program code for, based on the URL, identifying a source file associated with the electronic content;
  program code for, based on the URL, selecting one or more data elements of the source file-program code for, based on the URL, modifying the selected data elements; and
  program code for providing modified electronic content for use on the requesting client.

* * * * *